(No Model.)
H. A. HOUSE & H. A. HOUSE, Jr.
ROLLER SKATE WHEEL.
No. 333,072. Patented Dec. 22, 1885.
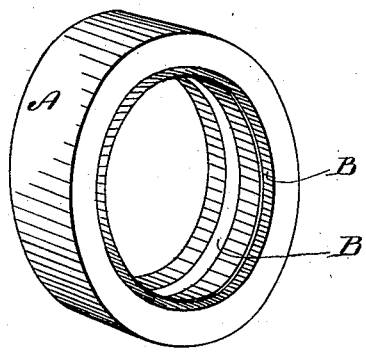
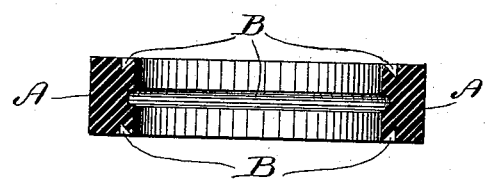
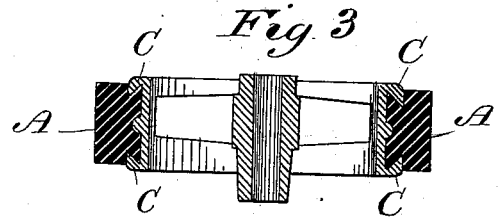
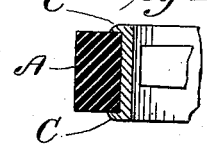 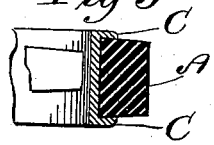
Witnesses
S. S. Williamson
W. J. Haviland
Inventors
Henry A. House
Henry A. House Jr.
By Smith & Hubbard
Attys.

UNITED STATES PATENT OFFICE.

HENRY A. HOUSE AND HENRY A. HOUSE, JR., OF BRIDGEPORT, CONN.

ROLLER-SKATE WHEEL.

SPECIFICATION forming part of Letters Patent No. 333,072, dated December 22, 1885.

Application filed October 16, 1885. Serial No. 180,070. (No model.)

*To all whom it may concern:*

Be it known that we, HENRY A. HOUSE and HENRY A. HOUSE, Jr., both citizens of the United States, residing at Bridgeport, in the county of Fairfield and State of Connecticut, have invented certain new and useful Improvements in Roller-Skate Wheels; and we do hereby declare the following to be a full, clear, and exact description of the invention, such as will enable others skilled in the art to which it appertains to make and use the same.

Our invention relates to certain novel and useful improvements in roller-skate wheels, and has for its object to present an exceedingly cheap and durable wheel, in which the tire is not liable to work loose from the felly; and with these ends in view our invention consists in the construction hereinafter described, and then specifically designated by the claim.

In order that those skilled in the art to which our invention appertains may more fully understand the same, we will proceed to describe it in detail, referring by letter to the accompanying drawings, forming a part of this specification, in which—

Figure 1 shows a perspective of the tire; Fig. 2, a cross-section of the same; Fig. 3, a cross-section of the completed wheel; and Figs. 4 and 5, cross-sections of completed wheels similar to those shown in Fig. 3, except that the felly embraces the tire at different places.

Similar letters denote like parts in the several figures of the drawings.

A is the tire, made of wood, fiber, or any other suitable material, and having formed in its inner face or sides recesses B. These recesses may be annular, as shown, or they may be formed here and there in the inner face and sides of the tire without any continuity or uniformity.

In making our improved wheel we first form a mold—such as would accommodate the hub, spokes, felly, and tire—and then place the tire itself in this mold in proper position. A central core is run through the hub, and a steel bushing may or may not be placed around said core, the object of such bushing being of course to afford a good axle-bearing in the completed hub. The metal as it enters the mold to form the felly will run into the recesses B in the tire C, and by its shrinkage when cooling will be firmly secured to said tire. As before stated, the location of these recesses is immaterial, so long as the molten metal enters them so as to cause the felly and tire to be firmly united; and, moreover, in some instances the recesses are entirely done away with and the felly cast so as to embrace the tire at the sides, as shown in Figs. 4 and 5; but this depends, of course, on the nature of the metal composing the felly and the extent to which it will shrink.

Having thus described our invention, what we claim as new, and desire to secure by Letters Patent, is—

As a new article of manufacture, a roller-skate wheel having the tire united to the felly by projections cast from the latter within recesses in the former, substantially as set forth.

In testimony whereof we affix our signatures in presence of two witnesses.

HENRY A. HOUSE.
HENRY A. HOUSE, JR.

Witnesses:
S. S. WILLIAMSON,
W. T. HAVILAND.